(12) United States Patent
Huusken et al.

(10) Patent No.: US 7,235,503 B2
(45) Date of Patent: Jun. 26, 2007

(54) DECORATIVE PANEL AND METHOD FOR THE MANUFACTURE THEREOF

(75) Inventors: Robert W. M. Huusken, De Lutte (NL); Gustav D. Rasmusson, Weert (NL)

(73) Assignee: Trespa International B.V., Weert (NL)

( * ) Notice: Subject to any disclaimer, the term of this patent is extended or adjusted under 35 U.S.C. 154(b) by 124 days.

(21) Appl. No.: 10/844,740

(22) Filed: May 14, 2004

(65) Prior Publication Data

US 2004/0253424 A1    Dec. 16, 2004

(30) Foreign Application Priority Data

May 14, 2003    (NL)    .................................... 1023421

(51) Int. Cl.
*B32B 27/04*    (2006.01)
*B32B 27/12*    (2006.01)
*B32B 5/02*    (2006.01)

(52) U.S. Cl. ...................... 442/132; 442/131; 442/154; 442/357; 442/381; 442/385; 442/413; 428/503

(58) Field of Classification Search ................ 442/357, 442/131, 132, 154, 413, 381, 385; 428/503
See application file for complete search history.

(56) References Cited

U.S. PATENT DOCUMENTS

| | | | | |
|---|---|---|---|---|
| 4,062,992 | A | * | 12/1977 | Power et al. .................. 428/90 |
| 4,501,635 | A | | 2/1985 | Siry et al. |
| 4,789,604 | A | * | 12/1988 | van der Hoeven .......... 428/503 |
| 4,801,495 | A | | 1/1989 | van der Hoeven .......... 428/286 |

FOREIGN PATENT DOCUMENTS

| | | |
|---|---|---|
| EP | 0 872 338 | 10/1998 |
| FR | 2 532 590 | 3/1984 |
| GB | 1 582 473 | 1/1981 |
| JP | 9066583 | * 3/1997 |

* cited by examiner

*Primary Examiner*—Norca L. Torres-Velazquez
(74) *Attorney, Agent, or Firm*—ProPat, L.L.C.

(57) ABSTRACT

The invention relates to a decorative panel comprising a carrier layer and a decorative layer on one or both surfaces of said carrier layer, which decorative layer comprises a synthetic resin layer with a base of one or more radiation-curable components. In addition to that, the present invention relates to a method for manufacturing the decorative panel.

12 Claims, No Drawings

DECORATIVE PANEL AND METHOD FOR THE MANUFACTURE THEREOF

FIELD OF THE INVENTION

The present invention relates to a decorative panel comprising a carrier layer and a decorative layer on one or both surfaces of said carrier layer, which decorative layer comprises a synthetic resin layer comprising one or more radiation-curable components. In addition to that, the present invention relates to a method for manufacturing the decorative panel.

BACKGROUND OF THE INVENTION

From U.S. Pat. No. 4,801,495 to the present applicant a decorative panel is known which comprises a core layer, a decorative layer being present on one or both surfaces, and an outer layer on at least one surface of the panel, which outer layer is mainly composed of a synthetic resin comprising one or more radiation-polymerizable compounds. The core materials mentioned therein include bonded fabric or mats of mineral fibres, paper, glass fibres, plastic fibres and mixtures thereof.

From U.S. Pat. No. 4,789,604 to the present applicant there is known a decorative panel having at least one mat decorative side, which panel comprises a core layer, with a decorative layer being present on one or both surfaces, and an outer layer on at least one surface of the panel, which outer layer is mainly composed of a synthetic resin comprising one or more radiation-polymerizable compounds. The core materials mentioned therein include panels or foils of a plastic or a metal.

At present there is a need for decorative panels having very good surface characteristics, such as a high scratch resistance, resistance to wear, impact resistance and a good dimensional stability and resistance to chemicals. In addition to that, such panels must be easy to work, for example saw, screw, drill, mill, nail etc. Preferably, no splinters will form during such operations. In addition, such panels must not warp in moist conditions.

BRIEF SUMMARY OF THE INVENTION

One aspect of the present invention is to provide a panel comprising a decorative layer which exhibits favourable characteristics as regards scratch resistance, resistance to wear, resistance to chemicals, impact resistance, dimensional stability and adhesion.

Another aspect of the present invention is to provide a method for manufacturing a decorative panel that can be provided with a mat or a high-gloss decorative layer.

DETAILED DESCRIPTION OF THE INVENTION

The present invention as referred to in the introduction is characterized in that a board from the group consisting of chipboard, MDF (medium density fibreboard) and HDF (high density fibreboard) is used as the carrier layer, wherein the decorative layer is composed of a substrate and a surface layer, wherein the substrate abuts against the carrier layer and the radiation-curable components are present in the surface layer.

One or more of the above aspects are achieved by using such a board as a carrier layer for a decorative panel. Furthermore, the panel is easy to work and relatively light in weight. At the same time it comprises a decorative layer which exhibits good characteristics as regards scratch resistance, resistance to wear, adhesion, impact resistance, resistance to chemicals and good dimensional stability, in particular in moist conditions.

The board, which is preferably based on wood fibres, is a material from the group of consisting of chipboard, MDF (medium density fibreboard) and HDF (high density fibreboard), because said materials are widely available, light in weight and simple in use, especially as regards the use thereof for do-it-yourself purposes.

The term chipboard is understood to mean board consisting of particles and a binder (resin), whose physical properties are determined by the amount of woodchips and the pressure used in compressing the materials into boards. The density of chipboard generally varies from 350–700 kg/m$^2$. The term MDF or HDF is understood to mean board consisting of very fine wood fibres bound with a resin, whose density varies from 400–650 kg/m$^2$, 650–800 kg/m$^2$ and higher than 800 kg/m$^2$.

The decorative panel according to the present invention preferably comprises one or more additives selected from the group consisting of pigments, colorants, flame-retardants, hydrophobicity-increasing agents and UV-absorbents. Said additives may be present in the carrier layer and/or in the decorative layer.

By adding one or more of the above additives, the panel can be given desired characteristics, such as a particular colour, fire-resistance, moisture-repellence and a decreased influence of harmful UV light.

The present invention further relates to a decorative panel whose decorative layer is composed of a substrate and a surface layer, wherein the substrate abuts against the carrier layer and wherein the radiation-curable components are present in the surface layer.

The advantage of a decorative panel comprising a decorative layer, which decorative layer consists of a substrate and a surface layer, is that a more stable decorative layer is provided, as a result of which the final decorative panel exhibits better characteristics, inter alia as regards scratch resistance, resistance to wear, resistance to chemicals, dimensional stability, impact resistance and adhesion.

Preferably, the synthetic resin is a resin selected from the group of unsaturated acrylates and methacrylates.

The fact is that such a group of compounds provides rigid networks after polymerisation of the synthetic resin.

Preferably, the synthetic resin is composed of an oligomer of epoxy and acrylate or silicone and acrylate, preferably an oligomer of polyester and acrylate, and in particular an oligomer of urethane and acrylate or the corresponding oligomers of methacrylate as prepolymers, which are capable of radiation-polymerisation, which have been radiation-polymerised, with mono-, tetra-, penta-, and/or hexaacrylate, preferably a diacrylate or triacrylate, of polyols or etherpolyols or the corresponding methacrylates, if appropriate.

With a view to obtaining a panel having good surface characteristics, the prepolymer according to the present invention is furthermore preferably an aliphatic oligomer of urethane and acrylate, which has been radiation-polymerized with a diacrylate or triacrylate.

In a special embodiment, in order to obtain an optimum stability and an optimum bond between the decorative layer and the carrier layer, the substrate is preferably selected from a paper or a nonwoven material impregnated with phenol/formaldehyde (PF), melamine/formaldehyde (MF), urea/formaldehyde (UF), polyurethane or combinations thereof.

A suitable nonwoven material is polyester or aramid or a combination thereof, although the present invention is not limited thereto.

The decorative layer according to the present invention is scratch-resistant with a scratch load of at least 1.5 Newton, preferably 2–7 Newton (DIN 53.799, part 10).

Such scratch resistance makes it possible to use the panel for a large variety of applications, in particular in an environment in which it is important to prevent scratches being formed, for example in worktops used in kitchens.

The decorative layer preferably has a reflectometer value of 10–95, preferably 75–95 and, in particular in the high-gloss range, of 90–95, at an angle of incidence of 85° (DIN 67.530).

In addition to that, the present invention relates to a method for manufacturing a decorative panel comprising a carrier layer and the decorative layer on one or both surfaces of said carrier layer, which decorative layer comprises a synthetic resin layer comprising one or more radiation-curable components, which method is characterized by the following steps:
i) providing a decorative layer,
ii) providing a carrier layer,
iii) contacting the decorative layer of step i) with the carrier layer of step ii), under pressure and temperature conditions such that a durable bond between the decorative layer of step i) and the carrier layer of step ii) is effected, with a board from the group consisting of chipboard, MDF (medium density fibreboard) and HDF (high density fibreboard) being used as the carrier layer.

Preferably, step iii) is carried out at a temperature in the 150–220° C. range, in particular in the 180–200° C. range.

Furthermore it is preferable to carry out step iii) at a pressure in the 15–35 bar range, in particular in the 20–30 bar range.

It is desirable to carry out step iii) for a period of time ranging between 10 and 120 seconds, in particular between 50 and 80 seconds.

Using the aforesaid process conditions, an optimum bond between the decorative layer and the carrier layer is achieved, so that a decorative panel having a good dimensional stability in addition to other desirable product characteristics is obtained.

In a special embodiment of the present invention, step i) preferably comprises an additional step iv), comprising
iv) applying a transparent upper layer to the decorative layer of step i), which layer comprises radiation-curable components, after which the upper layer is radiation-cured so as to obtain a decorative layer provided with a transparent upper layer.

A decorative panel comprising said optional transparent upper layer provides additional gloss, strength and scratch resistance.

Step i) may also comprise two substeps, viz.:
v) applying at least one liquid surface layer containing the radiation-curable components to a substrate;
vi) radiation-curing the surface layer of step v) so as to obtain the decorative layer of step i).

These steps can be carried out independently of steps i)–iii). A semi-finished product thus manufactured can be stored as such and be subjected to steps i)–iii) at a later stage so as to obtain the decorative panel according to the invention.

In specific embodiments it is desirable to provide an intermediate layer between the carrier layer of step ii) and the decorative layer of step i) before carrying out step iii).

Such an intermediate layer may be used as an additional stiffening layer or as an additional adhesive so as to provide a decorative panel exhibiting an improved adhesion and improved mechanical properties.

Said radiation-curing takes place via electron beam radiation (EBC), UV radiation, IR radiation or a combination thereof.

The present invention will now be explained in more detail by means of a number of examples and comparative examples, in which connection it should be noted that the present invention is not limited to such special embodiments.

EXAMPLES

Example 1

A decorative paper is impregnated with a phenol resin and cured by using electron beam radiation. The semi-finished product thus obtained is subsequently wound onto rolls and stored. To obtain the present decorative panel, the semi-finished product is laid on an MDF-type board. Subsequently, the assembly is placed in a compression device at a temperature of 185° C. and a pressure of 25 bar for 60 seconds so as to effect a durable bond between the decorative panel and MDF. Following that, the compression device is opened at the aforesaid temperature, with a high-gloss decorative panel being obtained, after which the next panel can be formed directly without cooling down the compression device. The scratch resistance is 3 N and the gloss value in accordance with DIN 67.530 (angle of incidence 85°) is 92.

Example 2

The same operations as described in Example 1 were carried out, except for the fact that a HDF board was used as the carrier layer. The semi-finished product being used retains its glossy nature and a high-gloss decorative panel is obtained. The scratch resistance is 5 N and the gloss value in accordance with DIN 67.530 (angle of incidence 85°) is 90.

Example 3

A melamine resin-impregnated decorative paper is laid on an MDF-type panel. Subsequently, the assembly is treated in a compression device at a temperature of about 180° C. and a pressure of 25 bar for 60 seconds. Following that, the compression device is cooled down to about 100° C. and subsequently opened, and a decorative panel having a glossy coating is obtained. Following that, the compression device is reheated again to a temperature of 180° C. for a next panel. Said cooling down and reheating takes up about half an hour, which is inadmissibly long in a commercial environment. The scratch resistance is 1.5 N and the gloss value in accordance with DIN 67.530 (angle of incidence 85°) is 75.

Comparative Example 1

A decorative panel is produced, using the same operations as described in comparative example 1, except for the fact that the compression device is opened at the high compression temperature of 180° C. already for removing the panel therefrom. The decorative panel thus obtained has an undesirably mat and grainy structure. The scratch resistance is 1.0 N and the gloss value in accordance with DIN 67.530 (angle of incidence 85°) is 70.

The present invention thus provides a method for manufacturing high-gloss decorative panels without repeated cooling and heating of the compression device being required, which leads to a reduction both of the required processing time and of the costs.

The invention claimed is:

1. A decorative panel comprising a carrier layer and a decorative layer on one or both surfaces of said carrier layer, wherein
   (i) a board selected from the group consisting of chipboard, medium density fibreboard and high density fibreboard is used as the carrier layer,
   (ii) the decorative layer is composed of a substrate and a surface layer,
   (iii) the substrate abuts against the carrier layer,
   (iv) a synthetic resin comprising one or more radiation cured components is present in the surface layer and
   (v) the decorative layer has a reflectometer value in the 75 to 95 range at an angle of incidence of 85°, as determined using DIN 67.530.

2. A decorative panel according to claim 1, wherein the carrier layer comprises one or more additives selected from the group consisting of pigments, colorants, flame-retardants, hydrophobicity-increasing agents and UV-absorbents.

3. A decorative panel according to claim 1, where the decorative layer comprises one or more additives selected from the group consisting of pigments, colorants, flame-retardants, hydrophobicity-increasing agents and UV-absorbents.

4. A decorative panel according to claim 1, wherein the synthetic resin is selected from unsaturated acrylates or unsaturated methacrylates.

5. A decorative panel according to claim 4, wherein the synthetic resin comprises a prepolymer formed from
   (a) an oligomer of
      (i) epoxy, silicone, polyester, or urethane and (ii) acrylate or methacrylate radiation-polymerised with
   (b) mono-, di-, tri-, tetra-, penta-, and/or hexa- acrylate or methacrylate, or polyols or etherpolyols thereof.

6. A decorative panel according to claim 5, wherein the prepolymer is an aliphatic oligomer of urethane and acrylate which has been radiation-polymerized with a diacrylate or triacrylate.

7. A decorative panel according to claim 1, wherein the substrate is selected from a paper or a nonwoven material impregnated with phenol/formaldehyde (PF), melamine/formaldehyde (MF), urea/formaldehyde (UF), polyurethane or combinations thereof.

8. A decorative panel according to claim 1, wherein the decorative layer is scratch-resistant with a scratch load of at least 1.5 Newton, as determined using DIN 53.799, part 10.

9. A decorative panel according to claim 1, wherein the decorative layer has a reflectometer value in the 90–95 range at an angle of incidence of 85°, as determined using DIN 67.530.

10. A decorative panel comprising a carrier layer and a decorative layer on one or both surfaces of said carrier layer,
    said carrier layer comprising a board selected from the group consisting of chipboard, medium density fibreboard and high density fibreboard,
    said decorative layer comprising a substrate and a surface layer,
    said substrate abutting against the carrier layer,
    said surface layer comprising synthetic resin comprising one or more radiation cured components,
    wherein the substrate is a paper or nonwoven material, impregnated with phenol/formaldehyde and the decorative layer has a reflectometer value in the 90 to 95 range at an angle of incidence of 85°, as determined using DIN 67.530, and a scratch load of from 2 to 7 Newton, as determined using DIN 53.799, part 10.

11. A decorative panel according to claim 1, wherein the carrier layer is chipboard having a density ranging from 350 to 700 $kg/m^2$.

12. A decorative panel according to claim 1, wherein the carrier layer is medium density fibreboard or high density fibreboard having a density ranging from 400 $kg/m^2$ to higher than 800 $kg/m^2$.

* * * * *